United States Patent [19]
Gilchrist et al.

[11] Patent Number: 5,182,906
[45] Date of Patent: Feb. 2, 1993

[54] HYBRID SPINNER NOSE CONFIGURATION IN A GAS TURBINE ENGINE HAVING A BYPASS DUCT

[75] Inventors: Alan R. Gilchrist; Thomas J. Sullivan, both of Fairfield; Roger C. Walker, Middletown, all of Ohio

[73] Assignee: General Electric Company, Cincinnati, Ohio

[21] Appl. No.: 864,189

[22] Filed: Apr. 3, 1992

Related U.S. Application Data

[63] Continuation of Ser. No. 600,788, Oct. 22, 1990, abandoned.

[51] Int. Cl.$^5$ ............................................. F02K 3/00
[52] U.S. Cl. .............................. 60/226.1; 416/245 R
[58] Field of Search ..................... 416/245 R, 224 A; 60/226.1

[56] References Cited

U.S. PATENT DOCUMENTS

| | | | |
|---|---|---|---|
| 4,047,379 | 9/1977 | Brookes et al. | 60/39.09 |
| 4,129,984 | 12/1978 | Nelson | 60/39.09 D |
| 4,327,548 | 5/1982 | Woodward | 60/226.1 |
| 4,393,650 | 7/1983 | Pool | 60/39.093 |
| 5,038,560 | 8/1991 | Seed | 60/226.1 |

OTHER PUBLICATIONS

Article entitled "GE joins fight for world's largest turbofan" appearing on p. 17 of Flight International, Jan., 1990.

*Primary Examiner*—Richard A. Bertsch
*Assistant Examiner*—Howard R. Richman
*Attorney, Agent, or Firm*—Jerome C. Squillaro

[57] ABSTRACT

A gas turbine engine has a forward rotor, a row of fan blades radially extending from the rotor, and a core turbine engine located rearwardly of the fan blades and rotor and coupled to the rotor for rotatably driving the rotor. An outer annular nacelle surrounds the rotor, fan blades and core engine. An inner annular splitter fairing is disposed rearwardly of the fan blades, surrounds the core engine, and is spaced radially inwardly from the nacelle so as to define therebetween a bypass air flow duct located outwardly from the core engine and rearwardly of the fan blades for producing thrust upon rotation of the rotor and fan blades. A hybrid shape spinner nose is attached about the rotor and projects forwardly therefrom within the nacelle and forwardly of the fan blades. The hybrid shape spinner nose has a forward substantially conical section spaced forwardly of the fan blades, a rearward substantially conical section projecting forwardly of and merging rearwardly with the fan blades, and a transition connecting the forward and rearward sections such that the spinner nose is provided with a compound, substantially conical configuration in which the slope of the forward substantially conical section is greater than the slope of an imaginary conical surface connecting a front end of the spinner nose and a leading edge of the annular splitter fairing, whereas the slope of the rearward substantially conical section is less than the slope of such imaginary conical surface.

12 Claims, 4 Drawing Sheets

HYBRID SPINNER NOSE CONFIGURATION IN A GAS TURBINE ENGINE HAVING A BYPASS DUCT

This application is a continuation of application Ser. No. 07/600,788, filed Oct. 22, 1990, now abandoned.

BACKGROUND OF THE INVENTION

1. Field of the Invention

The present invention relates generally to a gas turbine engine and, more particularly, to a hybrid shape spinner nose configuration in a gas turbine engine having a bypass duct.

2. Description of the Prior Art

A gas turbine engine of the turbofan type generally includes a forward fan and booster compressor, a middle core engine, and an aft low pressure power turbine. The core engine encompasses a compressor, a combustor and a high pressure turbine in a serial flow relationship. The compressor and high pressure turbine of the core engine are interconnected by a central shaft. The compressor is rotatably driven to compress air entering the core engine to a relatively high pressure. This high pressure air is then mixed with fuel in the combustor and ignited to form a high energy gas stream. This gas stream flows aft and passes through the high pressure turbine, rotatably driving it and the core engine shaft which, in turn, rotatably drives the compressor.

In the turbofan engine, the residual gas stream leaving the core engine high pressure turbine is expanded through a second turbine, which as mentioned above is the aft low pressure turbine. The aft low pressure turbine, in turn, drives the forward fan via a separate shaft which extends forwardly through the central shaft of the high pressure turbine rotor. Although some thrust is produced by the residual gas stream exiting the core engine, most of the thrust is produced by an air stream generated by the forward fan that bypasses the core engine through an annular duct disposed radially outwardly of and surrounding the core engine.

The annular bypass duct is located rearward of a row of circumferentially spaced fan blades of the forward fan and between the outer annular nacelle and inner splitter fairing of the engine. Typically, the turbofan engine also includes a spinner nose projecting forwardly from the row of fan blades. Both the spinner nose and row of fan blades are a rotor of the booster compressor.

The rotary energy of the core engine thus produces thrust indirectly by driving the forward fan. Ensuring uninterrupted operation of the core engine is thereby essential to generation of thrust by the forward fan. One condition which can be detrimental to core engine operation is ingestion of ice, hail and miscellaneous debris into the core engine inwardly of the splitter fairing rather than diversion of such foreign materials outwardly of the splitter fairing through the bypass duct.

Ice formation typically tends to occur on the spinner nose of the engine. The spinner nose has different shapes in different engines. Typically, the configuration of the spinner nose is either elliptical or conical with each having both advantages and disadvantages. The elliptical shaped spinner nose tends to shed or rebound debris outwardly of the core engine and into the engine's bypass duct, thus providing the engine core with a level of protection against entry of ice, hail and miscellaneous ground debris. However, cold temperature testing has demonstrated that the conical shaped spinner nose will build up less ice in the first place than an elliptical spinner nose for the same operating conditions and environment. However, the conical shaped spinner nose produces little or no outward rebound debris and thus can permit up to 100% capture of debris rearwardly up the spinner nose surface and into the core engine.

The degree to which ice, hail and debris will be ingested into the core engine past the splitter fairing also depends upon other factors besides the shape of the spinner nose. These factors are the size of the gap between the rear radial edge of the fan blades and the leading edge of the splitter fairing and the axial depth of the fan blades.

Consequently, a need exists for improvement of the design of the spinner nose configuration which will reduce the degree to which ice, hail and debris is ingested into the core engine.

SUMMARY OF THE INVENTION

The present invention provides a hybrid spinner nose configuration designed to satisfy the aforementioned needs. The hybrid spinner nose configuration of the present invention preferably is characterized as a compound, substantially conical configuration formed by a forward substantially conical portion, a rearward substantially conical portion, and a transition located between and interconnecting the forward and rearward portions. The transition defines a circumferential surface or line about the spinner nose. Forward of the transitional surface or line, the slope of the forward nose portion is equal to or greater than the slope of an imaginary conical surface symmetrical about a central axis of the spinner nose and connecting the front end of the spinner nose and the leading edge of the annular splitter fairing. Rearward of the transitional surface or line, the slope of the rearward nose portion is less than the slope of such imaginary conical surface. Such slope of the forward nose portion means that debris of such a size not influenced by the airstream striking the spinner nose forwardly of the transitional surface or line will rebound or slide off the spinner nose surface at lines tangent to the spinner slope, outwardly past the core engine and through the bypass duct, whereas such slope of the rearward nose portion means that debris striking the spinner nose rearwardly of the transitional surface or line will rebound or slide off the spinner nose surface at lines tangent to the spinner slope and possibly enter the core engine.

However, by minimizing the distance between the transitional surface or line and the leading edge of the fan blades and maximizing the gap between the trailing edge of the fan blades and leading edge of the splitter fairing while maintaining sufficient aerodynamic flow of air into the forward fan, the amount of debris which actually enters the core engine can be further reduced. This compound, substantially conical configuration thus combines the advantages of the two prior art spinner nose configurations without adopting their disadvantages so as to minimize core engine ingestion of rain, hail and debris particles not influenced by the air stream flow and also minimize the potential for ice formation and build up on the spinner nose.

Accordingly, the present invention is set forth in a gas turbine engine having a forward rotor, a row of circumferentially spaced fan blades attached to and extending radially outward from the rotor, a core turbine engine located rearwardly of the fan blades and rotor and being coupled to the rotor for rotatably driving the rotor, an outer annular nacelle surrounding the rotor, fan blades, and core engine, and an inner annular splitter fairing disposed rearwardly from the fan blades, surrounding the core engine and spaced radially inwardly from the nacelle so as to define therebetween a bypass air flow duct located outwardly from the core engine and rearwardly of the fan blades for producing thrust upon rotation of the rotor and fan blades therewith. The present invention is directed to a hybrid spinner nose having a central axis and being attached about the rotor and projecting forwardly therefrom and forwardly of the fan blade. The hybrid spinner nose comprises: (a) a forward nose portion spaced forwardly of the row of fan blades and terminating in a forward end; (b) a rearward nose portion projecting forwardly of and merging rearwardly with the row of fan blades; and (c) a transition located between and interconnecting the forward and rearward nose portions in a tandem arrangement such that the spinner nose has a compound, substantially conical configuration in which the overall slope of the forward nose portion is greater than overall slope of the rearward nose portion relative to the central axis of the spinner nose.

More particularly, the transition defines a circumferential surface or line about the spinner nose which is disposed outwardly beyond an imaginary conical surface extending symmetrically about the central axis of the spinner nose and between and connecting the front end of the spinner nose and a leading edge of the annular splitter fairing. The forward and rearward nose portions extending from opposite sides of the transitional line are first and second substantially conical sections which extend coaxially with and are symmetrical about the central axis of the spinner nose. The first substantially conical section has a slope forwardly of the transition which is greater than a slope of the imaginary conical surface. Preferably, the second substantially conical section has a slope rearwardly of the transition which is less than the slope of such imaginary conical surface.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
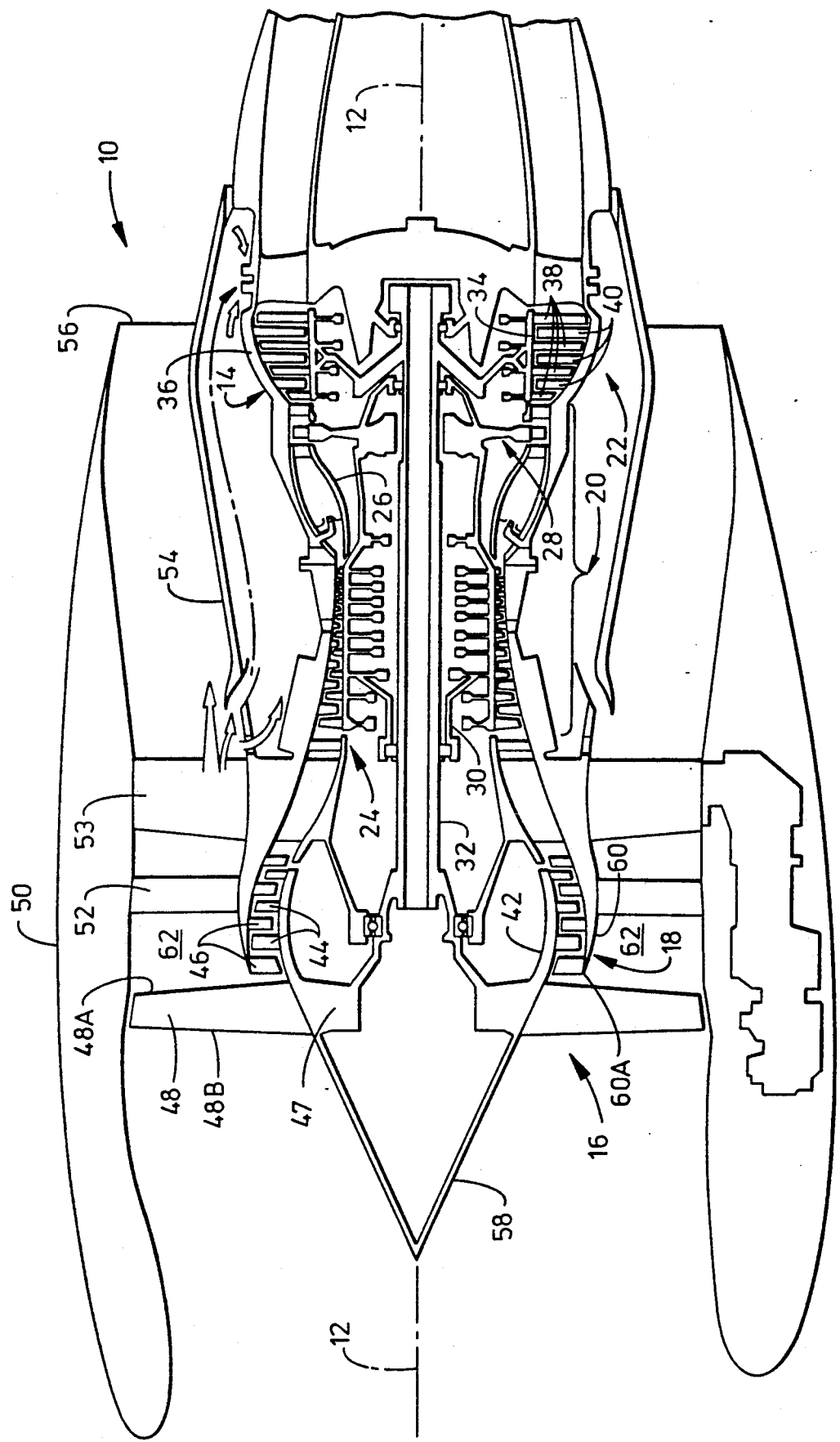
FIG. 1 is a longitudinal axial sectional view of a prior art gas turbine engine.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is illustrated a prior art gas turbine engine, generally designated 10. The engine 10 has a longitudinal center line or axis 12 and an annular casing 14 disposed coaxially and concentrically about the axis 12. The engine 10 includes a forward fan 16 and booster compressor 18, a middle core engine 20 and an aft low pressure power turbine 22. The core engine 20 encompasses a multi-stage compressor 24, a combustor 26 and a high pressure turbine 28, either single or multiple stage, all arranged coaxially about the longitudinal axis 12 of the engine 10 in a serial flow relationship. An annular outer drive shaft 30 fixedly interconnects the compressor 24 and high pressure turbine 28 of the core engine 20.

The compressor 24 is rotatably driven to compress air entering the core engine 20 to a relatively high pressure. This high pressure air is then mixed with fuel in the combustor 26 and ignited to form a high energy gas stream. This gas stream flows aft and passes through the high pressure turbine 28, rotatably driving it and the outer drive shaft 30 of the core engine 20 which, in turn, rotatably drives the multi-stage compressor 24.

In the engine 10 being of the turbofan type, the residual gas stream discharged by the core engine high pressure turbine 28 is expanded through a second, power turbine, which as mentioned above is the aft low pressure turbine 22. The aft low pressure turbine 22 is rotated by gas stream flow and, in turn, drives the forward fan 16 and booster compressor 18 via a separate inner drive shaft 32 which extends forwardly through the annular outer drive shaft 30 of the core engine 20. Although some thrust is produced by the residual gas stream exiting the core engine 20, most of the thrust produced is generated by the forward fan 16.

The low pressure turbine 22 includes an annular rotatable rotor 34 and a stationary stator 36 disposed radially outwardly of the rotor 34. The low pressure turbine rotor 34 includes a plurality of turbine blade rows 38 extending radially outwardly therefrom and axially spaced from one another. The low pressure turbine stator 36 includes a plurality of stator vane rows 40 fixedly attached to and extending radially inwardly from the stationary casing 14. The stator vane rows 40 are axially spaced so as to alternate with the turbine blade rows 34 and define therewith multiple stages of the low pressure turbine 22.

The forward booster compressor 18 driven by the low pressure turbine 22 via the inner drive shaft 32 includes a rotor 42 and a plurality of booster blade rows 44 fixedly attached to and extending radially outwardly from the rotor 42 for rotation therewith. A plurality of booster stator vane rows 46 are fixedly attached to and extend radially inwardly from the stationary casing 14. Both the booster blade rows 44 and the stator vane rows 46 are axially spaced and so arranged to alternate with one another.

A fan disc 47, supported off the main engine shaft 32, supports a row of circumferentially-spaced fan blades 48 of the forward fan 16. The row of fan blades 48 is housed within a nacelle 50 of the engine 10 supported about the stationary casing 14 by a plurality of radially extending and circumferentially spaced struts 52, 53. A cowling 54 which encloses the core engine 20 and low pressure turbine 22 is disposed within and extends coaxially with a rear portion of the nacelle 50 so as to define therewith the discharge nozzle 56.

Typically, the turbofan engine 10 also includes a spinner nose 58 projecting forwardly from the row of fan blades 48. Both the spinner nose 58 and row of fan blades 48 are supported by the fan disc 47. Further, a splitter fairing 60 is provided on the forward portion of the cowling 54. The spinner nose 58 pierces an air stream flow drawn through the nacelle 50 by rotation of the row of the fan blades 48 and the splitter fairing 60 separates the air stream flow into an inner portion which enters the core engine 20 and an outer portion which bypasses the core engine, flowing through an annular bypass duct 62 located rearwardly of the fan blades 48 and between the outer annular nacelle 50 and inner splitter fairing 60. Most of the thrust produced by the engine 10 is generated by the air flow bypassing the core engine 20 through the annular bypass duct 62.

Spinner Nose Configurations of Prior Art

The core engine 20 thus produces thrust indirectly by rotating the fan disc 47 which, in turn, rotates the blades 48 of the forward fan 16. Ensuring uninterrupted operation of the core engine 20 is thereby essential to generation of thrust by the forward fan 16. One condition which can be detrimental to core engine operation is ingestion of ice, hail and miscellaneous debris into the core engine 20 rather than diversion of such foreign materials through the bypass duct 62. The configuration of the spinner nose 58 of the engine 10 is one major factor influencing ingestion of ice, hail and debris into the core engine 20.

Figure 2:
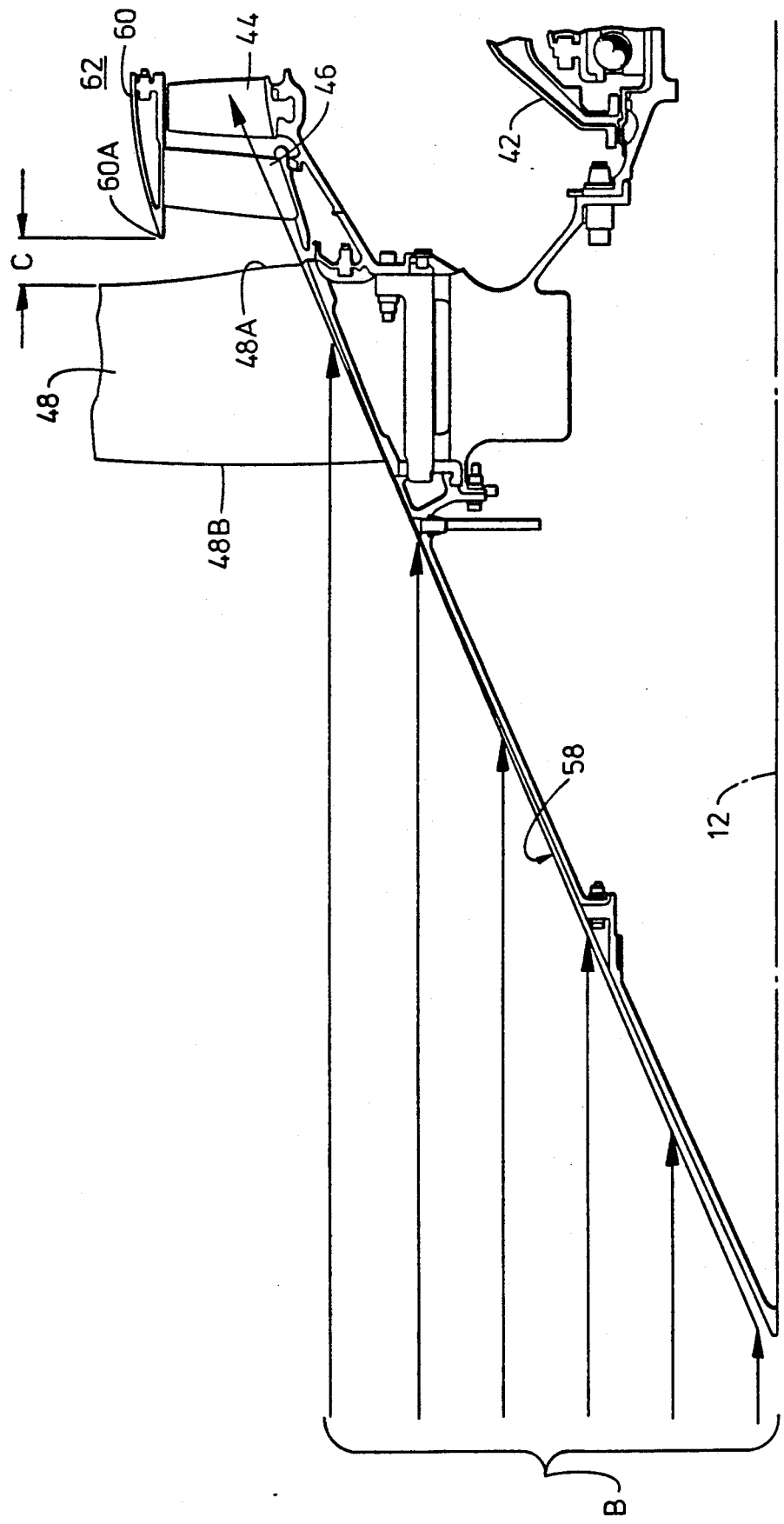
FIG. 2 is an enlarged fragmentary view of one prior art construction and arrangement of a spinner cone, row of fan blades, and splitter fairing of a turbine engine.
Figure 3:
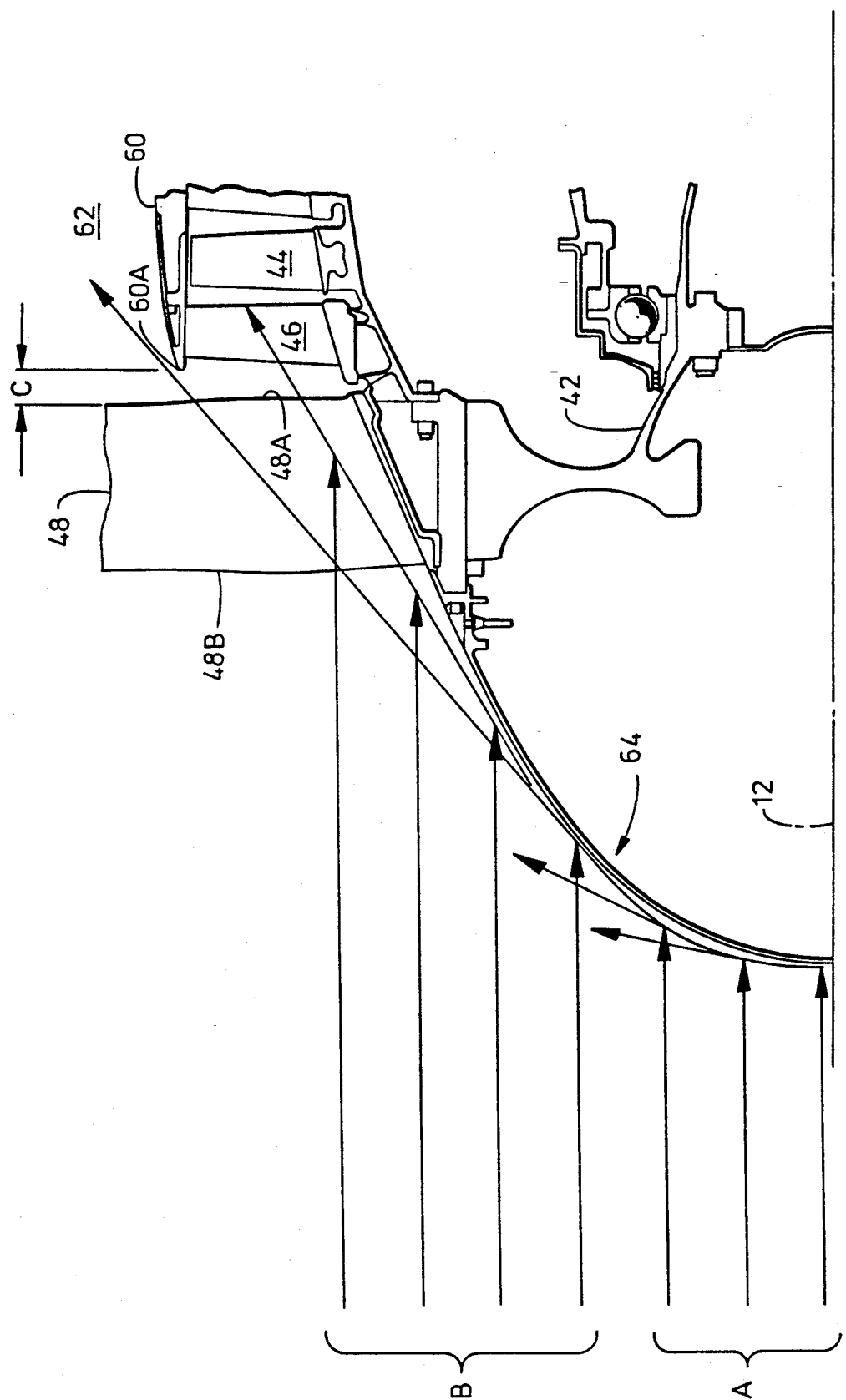
FIG. 3 is an enlarged fragmentary view of another prior art construction and arrangement of a spinner cone, row of fan blades, and splitter fairing of a turbine engine.

Referring now to FIGS. 2 and 3, it is seen that the spinner nose 58 can have different shapes or configurations. In FIGS. 1 and 2, the spinner nose 58 which extends symmetrically about the axis 12 of the engine 10 has an overall conical configuration. In FIG. 3, the spinner nose 64 which extends symmetrically about the axis 12 of the engine 12 has an overall elliptical configuration. Each configuration has its own advantages and disadvantages.

On the one hand, the conical shaped spinner nose 58 of FIGS. 1 and 2 will build up little, if any ice, whereas the elliptical shaped spinner nose 64 builds up ice, for the same operating conditions and environment. On the other hand, the conical shaped spinner nose 58 produces little or no outward rebound of debris and thus permits practically 100% capture of debris rearwardly up the spinner nose surface and into the core engine 20, as seen in FIG. 2. By contrast, the elliptical shaped spinner nose 64 tends to shed or rebound debris outwardly of the core engine 20 and into the bypass duct 62, thus providing the engine core with a level of protection against entry of ice, hail and miscellaneous ground debris.

The lines grouped and identified as A and B in FIGS. 2 and 3 show, as a function of spinner nose shape, the amount of debris not influenced by the air stream that will be ejected into the fan bypass duct 62 (group A) and the amount of debris that will be ingested into the core engine 20 (group B).

Spinner Nose Configuration of Present Invention

The degree to which ice, hail and debris will be ingested into the core engine 20 past the splitter fairing 60 also depends upon other factors besides the shapes of the spinner noses 58, 64. These factors are the size of the gap C between the rear radial edges 48A of the fan blades 48 and the leading edge 60A of the splitter fairing 60 and the particular size, e.g., axial depth, of the fan blades 48 of the given engine 10. The influence of the spinner nose configuration ends at the leading edges 48B of the fan blades 48.

Figure 4:
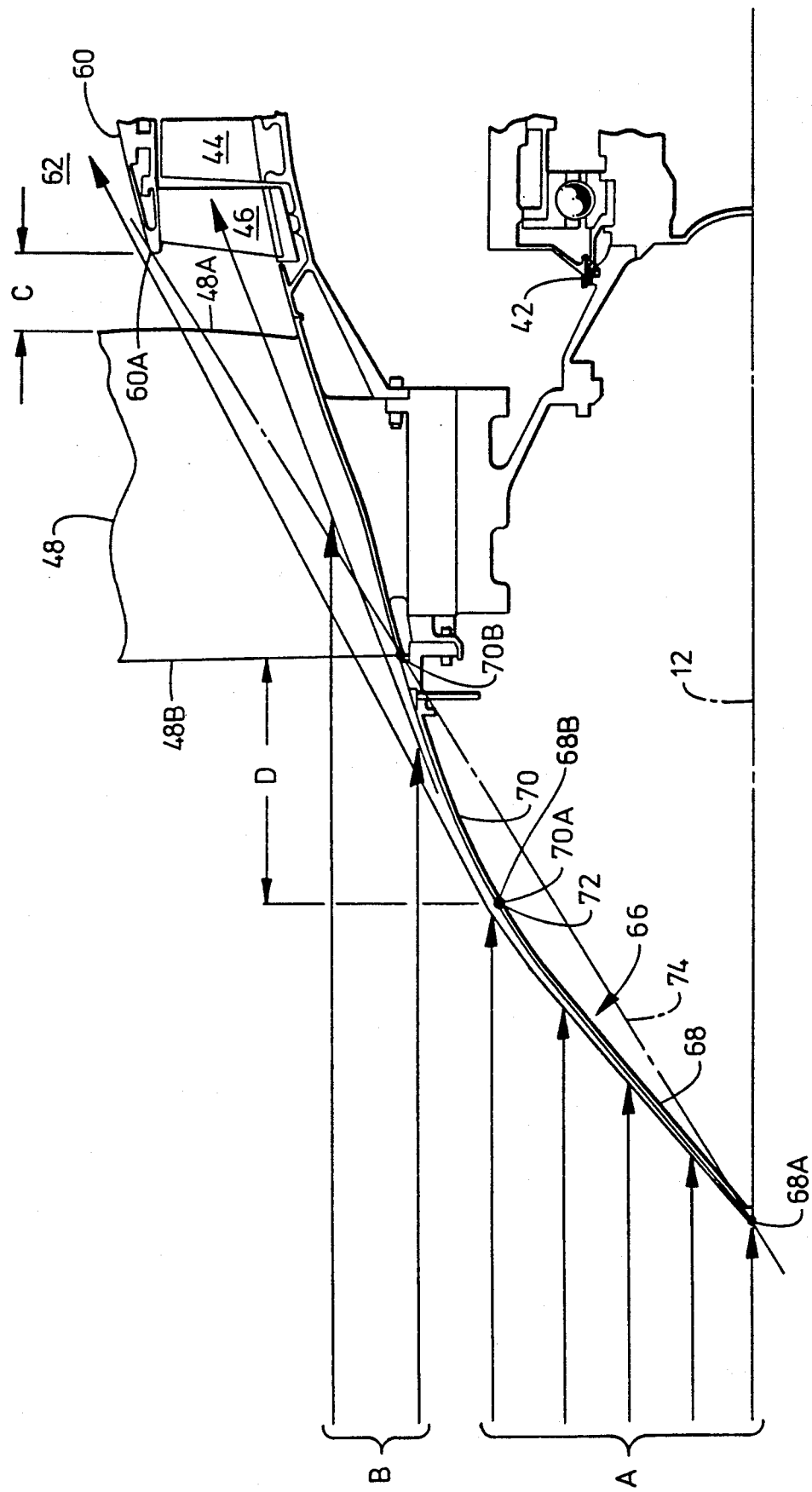
FIG. 4 is an enlarged fragmentary view of the construction and arrangement of a spinner cone, row of fan blades, and splitter fairing of a turbine engine in accordance with the present invention.

Referring to FIG. 4, a hybrid spinner nose 66 of the present invention includes a forward nose portion 68, a rearward nose portion 70, and a transition 72 between the forward and rearward nose portions 68, 70. The forward nose portion 68 has a generally symmetrical, substantially conical configuration extending along and about the central axis 12 of the engine 10 and thus also the hybrid spinner nose 66. The forward nose portion 68 terminates in opposite forward and rear ends 68A, 68B with the rear end 68B of the forward nose portion 68 spaced forwardly of the row of fan blades 48.

The rearward nose portion 70 has a generally symmetrical, substantially conical configuration extending along and about the central axis 12. The rearward nose portion 70 terminates in opposite forward and rear ends 70A, 70B and projects forwardly of and merges rearwardly with the row of fan blades 48. At the rear end 70B, the rearward nose portion 70 terminates at the inlet to the core engine 20.

The transition 72 is located between and interconnects the forward and rearward nose portions 68, 70 in a tandem arrangement so as to provide the hybrid spinner nose 66 with a compound, substantially conical configuration in which the overall slope of the forward nose portion 68 is greater than overall slope of the rearward nose portion 70 relative to the central axis 12 of the engine 10. When viewed with reference to along the central axis 12 of the spinner nose 66, the transition 72 is spaced approximately midway between the leading edge 48B of the row of fan blades 48 and the forward end 68A of the forward nose portion 68. The transition 72 defines a circumferential surface or line about the hybrid spinner nose 66 which is disposed outwardly beyond an imaginary conical surface 74 extending symmetrically about the central axis 12 of hybrid spinner nose 66 and between and connecting the front end 68A of the spinner nose 66 and the leading edge 60A of the splitter fairing 60. As used in the definition of the transition 72, a line would be equivalent to a surface and vice-versa.

Forward of the transitional surface or line 72, the slope of the forward nose portion 68 is greater than the slope of the imaginary conical surface 74. Rearward of the transitional surface or line 72, the slope of the rearward nose portion 70 is less than the slope of the imaginary conical surface 74. Such slope of the forward nose portion 68 means that debris of such a size not influenced by the airstream striking the spinner nose 66 forwardly of the transitional surface or line 72 will rebound or slide off the spinner nose surface at lines tangent to the spinner slope, outwardly past the core engine 20 and through the bypass duct 62, whereas such slope of the rearward nose portion 70 means that debris striking the spinner nose 66 rearwardly of the transitional surface or line 72 will rebound or slide off the spinner nose surface at lines tangent to the spinner slope and possibly enter the core engine 20.

However, by minimizing the distance between the transitional line 72 and the leading edges 48B of the fan blades 48 (the distance "D" as shown in FIG. 4) and maximizing the gap C between the trailing edge 48A of the fan blades 48 and leading edge 60A of the splitter fairing 60 while maintaining sufficient aerodynamic flow of air into the forward fan 16, the amount of debris which actually enters the core engine 20 is further reduced by employment of the compound, substantially conical configuration of the hybrid spinner nose 66 of the present invention. The amount of debris ingested into the core engine 20, as represented by lines B, will be minimized by moving the spinner/splitter tangency point at transition 72 as close as possible to the leading edges 48B of the fan blades 48. The substantially conical configuration of the forward nose portion 68 will lower the potential for ice buildup at the spinner nose 66, reducing the chance of ice damage to the fan 16 from spinner ice shedding. This is especially of concern where the fan blades are made from nonmetallic, composite materials. As defined herein, substantially conical means a generally linear surface or line which may include slightly arcuate segments.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. In a gas turbine engine having a forward rotor, a row of circumferentially spaced fan blades attached to and extending radially outward from said rotor, a core turbine engine located rearwardly of said fan blades and rotor and being coupled to said rotor for rotatably driving said rotor, an outer annular nacelle surrounding said rotor, fan blades, and core engine, and an inner annular splitter fairing disposed rearwardly from said fan blades, surrounding said core engine and spaced radially inwardly from said nacelle so as to define therebetween a bypass air flow duct located outwardly from said core engine and rearwardly of said fan blades for producing thrust upon rotation of said rotor and fan blades therewith, a hybrid spinner nose having a central axis and being attached about said rotor and projecting forwardly therefrom and forwardly of said fan blades, said hybrid spinner nose comprising:
   (a) a forward nose portion spaced forwardly of said row of fan blades and terminating in a forward end;
   (b) a rearward nose portion projecting forwardly of and merging rearwardly with said row of fan blades; and
   (c) a transition located between and interconnecting said forward and rearward nose portions in a tandem arrangement with said transition as viewed along the central axis of the spinner nose being spaced approximately midway between said forward end of said forward nose portion and said row of fan blades such that the portion of said spinner nose forwardly of said row of fan blades has a compound conical configuration in which overall slope of said forward nose portion is greater than overall slope of said rearward nose portion relative to said central axis of said spinner nose.

2. The spinner nose as recited in claim 1, wherein said transition defines a circumferential line about said spinner nose which is disposed outwardly beyond an imaginary conical surface extending symmetrically about said central axis of said spinner nose and connecting said front end of said spinner nose and a leading edge of said annular splitter fairing.

3. The spinner nose as recited in claim 2, wherein said forward and rearward nose portions extending from opposite sides of said circumferential transitional line are first and second substantially conical sections which extend symmetrically about and coaxially with said central axis of said spinner nose.

4. The spinner nose as recited in claim 1, wherein said forward nose portion is a first substantially conical section symmetrical about said central axis of said spinner nose and having a slope forwardly of said transition which is greater than a slope of an imaginary conical surface extending symmetrically about said central axis and connecting said front end of said spinner nose and a leading edge of said annular splitter fairing.

5. The spinner nose as recited in claim 1, wherein said rearward nose portion is a second substantially conical section symmetrical about said central axis of said spinner nose and having a slope rearwardly of said transition which is less than a slope of an imaginary conical surface extending symmetrically about said central axis and connecting said front end of said spinner nose and a leading edge of said splitter fairing.

6. The spinner nose as recited in claim 1, wherein said transition defines a circumferential surface about said spinner nose which is disposed outwardly beyond an imaginary conical surface extending symmetrically about said central axis of said spinner nose and connecting said front end of said spinner nose and a leading edge of said annular splitter fairing.

7. The spinner nose recited in claim 6, wherein said forward and rearward nose portions extending from opposite sides of said circumferential transitional surface are first and second substantially conical sections which extend symmetrically about and coaxially with said central axis of said spinner nose.

8. In a gas turbine engine having a forward rotor, a rotor of circumferentially spaced fan blades attached to and extending radially outward from said rotor, a core turbine engine located rearwardly of said fan blades and rotor and being coupled to said rotor for rotatably driving said rotor, an outer annular nacelle surrounding said rotor, fan blades, and core engine, and an inner annular splitter fairing disposed rearwardly from said fan blades, surrounding said core engine and spaced radially inwardly from said nacelle so as to define therebetween a bypass air flow duct located outwardly from said core engine and rearwardly of said fan blades for producing thrust upon rotation of said rotor and fan blades therewith, a hybrid spinner nose having a central axis and being attached about said rotor and projecting forwardly therefrom and forwardly of said fan blades, said hybrid spinner nose comprising:
   (a) a forward nose portion having a generally symmetrical conical configuration extending along and about said central axis of said nose and terminating in opposite forward and rear ends, said forward nose portion at said rear end spaced forwardly of said row of fan blades;

(b) a rearward nose portion having a generally symmetrical conical configuration extending along and about said central axis of said nose and terminating in opposite forward and rear ends, said rearward nose portion projecting forwardly of and merging rearwardly with said row of fan blades and at said rear end terminating at an inlet to said core engine; and (c) a transition located between and interconnecting said forward and rearward nose portions in a tandem arrangement with said transition as viewed along the central axis of said spinner nose being spaced approximately midway between said forward end of said forward nose portion and said row of fan blades such that the portion of said spinner nose forwardly of said row of fan blades has a compound conical configuration in which overall slope of said forward nose portion is greater than overall slope of said rearward nose portion relative to said central axis of said spinner nose.

9. The spinner nose as recited in claim 8, wherein said transition defines a circumferential line about said spinner nose which is disposed outwardly beyond an imaginary conical surface extending symmetrically about said central axis of said spinner nose and connecting said front end of said spinner nose and a leading edge of said annular splitter fairing.

10. The spinner nose as recited in claim 8, wherein said forward nose portion has a slope forwardly of said transition which is greater than a slope of an imaginary conical surface extending symmetrically about said central axis of said spinner nose and connecting said front end of said spinner nose and a leading edge of said annular splitter fairing.

11. The spinner nose as recited in claim 8, wherein said rearward nose portion has a slope rearwardly of said transition which is less than a slope of an imaginary conical surface extending symmetrically about said central axis of said spinner nose and connecting said front end of said spinner nose and a leading edge of said splitter fairing.

12. The spinner nose recited in claim 8, wherein said transition defines a circumferential surface about said spinner nose which is disposed outwardly beyond an imaginary conical surface extending symmetrically about said central axis of said spinner nose and connecting said front end of said spinner nose and a leading edge of said annular splitter fairing.

* * * * *